Jan. 13, 1931. W. L. ECABERT 1,788,992
CHAIN CASE
Filed Aug. 1, 1928
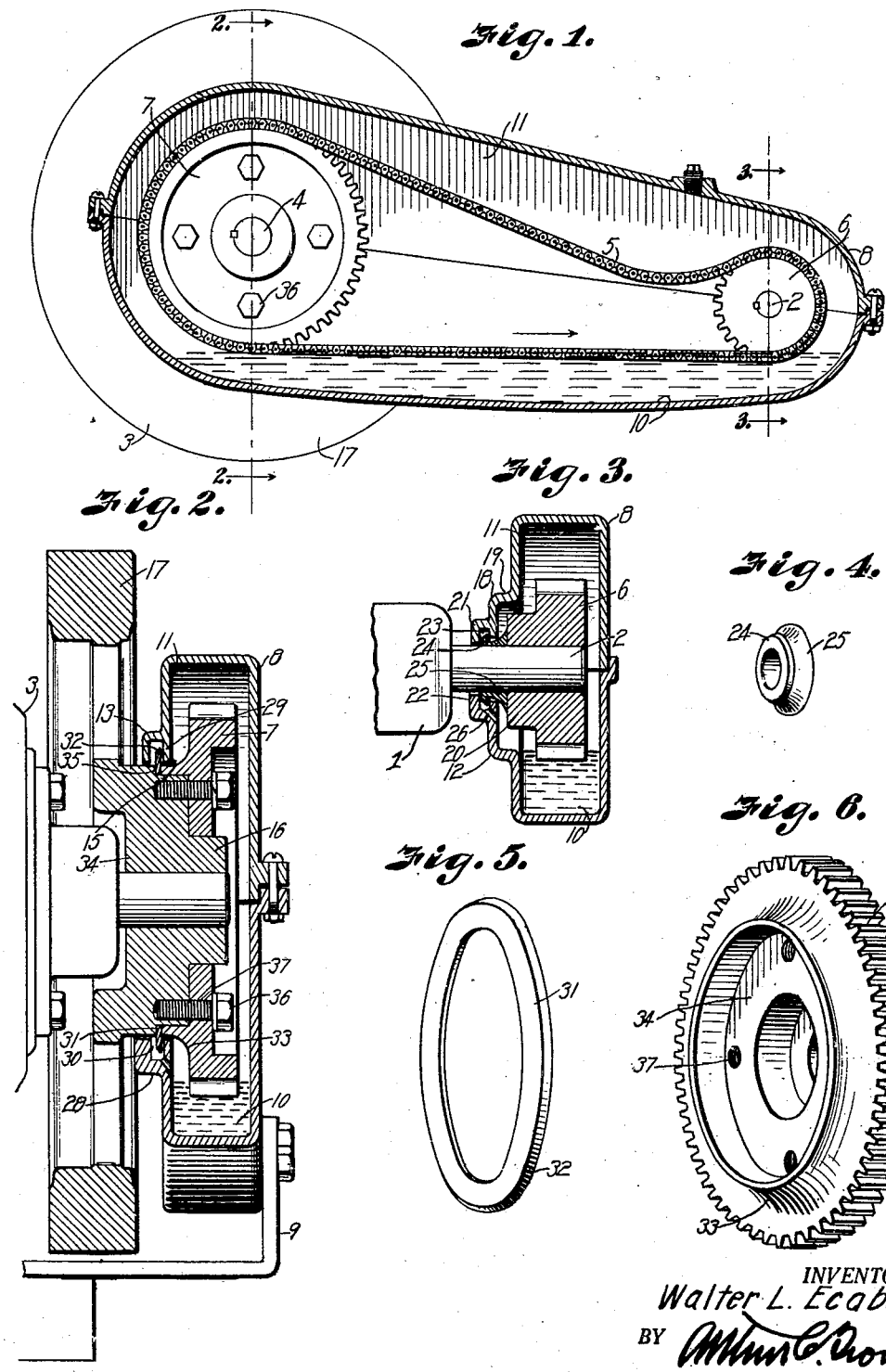
INVENTOR.
Walter L. Ecabert.
BY
ATTORNEY Patented Jan. 13, 1931

1,788,992

UNITED STATES PATENT OFFICE

WALTER L. ECABERT, OF OMAHA, NEBRASKA, ASSIGNOR TO BAKER ICE MACHINE CO., INC., OF OMAHA, NEBRASKA, A CORPORATION OF NEBRASKA

CHAIN CASE

Application filed August 1, 1928. Serial No. 296,813.

My invention relates to packing rings, and more particularly to devices of that character for preventing leakage from one part of a rotating shaft to another, as in a transmission including a chain running in an oil bath and wherein oil leaking from the casing might enter the driving or driven member of the transmission, the principal object of the invention being to avoid flooding and waste of oil by retarding movement of oil to the shaft bearings.

In accomplishing this and other objects of the invention, I have provided improved details of structure, the preferred forms of which are illustrated in the accompanying drawings, wherein:

Fig. 1 is a longitudinal sectional view of a transmission embodying my invention.

Fig. 2 is an enlarged sectional view on the line 2—2, Fig. 1, illustrating an application of my improved oil retainer to a driven sprocket and chain case.

Fig. 3 is an enlarged sectional view on the line 3—3, Fig. 1, illustrating an application of the oil retainer to a driving sprocket and chain case.

Fig. 4 is a detail perspective view of the oil-retaining ring shown in Fig. 3.

Fig. 5 is a perspective view of the collar portion of the oil retainer shown in Fig. 2.

Fig. 6 is a detail perspective view of the driven sprocket shown in Fig. 2, illustrating the formation of the ring portion of the oil retainer integral with the sprocket.

Referring in detail to the drawings:

1 designates a driving member such as a motor having a drive shaft 2, 3 a driven member which for convenience will be referred to as a compressor having a driven shaft 4, and 5 a chain running over a pinion or sprocket 6 keyed to the drive shaft and a gear or sprocket 7 connected to the driven shaft. A chain case 8 supported by brackets such as 9 in fixed position adjacent the members 1 and 3 encloses the sprockets and includes a sump portion 10 containing oil in which the chain runs.

The inner vertical wall 11 of the case has bearing portions 12 and 13 provided with apertures 14 and 15 for receiving respectively the drive shaft 2 and the hub 16 of a fly wheel 17 keyed to the driven shaft 4 and supporting the sprocket 7, as presently particularly described.

My invention includes means for preventing leakage of oil through the bearing apertures of the two portions of the casing, and while the means may be identical in the two situations, I preferably vary details of the structure and therefore will describe separately the oil retainers for the motor end and for the compressor end of the apparatus.

A portion 18 of the wall 11 is offset therefrom by a cylindrical wall 19 to form a recess for receiving the hub 20 of the driving sprocket, and a cylindrical wall 21 extending from the portion 18 in spaced relation with the lower end or flange 22 thereof spaces the bearing portion 12 from the portion 18 to form a recess 23 for receiving a collar 24 rotated by the driving shaft, as presently described, to prevent oil from passing from the case to the bearing opening and return of the oil to the case.

A ring 25 having a beveled and preferably concave edge is mounted on the shaft 2 with its larger outer end engaging the hub 20 and its smaller inner end extending beneath the flange 22 of the offset wall 18 into the recess 23 where it is engaged with the collar 24, the collar being integral with the ring 25 in the illustrative application of the invention shown in Figs. 3 and 4, and the ring being pressed on the shaft.

The edge of the collar is beveled and inclines upwardly from the motor side toward the case, whereby oil passing over the edge of the collar will be discharged centrifugally and angularly towards the inner face of the lower end of the wall 18, and may then pass through a channel 26 into the sump or lower portion 10 of the oil chamber.

Oil reaching the beveled ring 25 will be centrifugally moved to the larger outer portion thereof and discharged thence to the wall of the case.

The case bearing portion 13 for the fly wheel hub is also offset from the case wall 11 and is connected thereto by a cylindrical wall 28 which spaces the portion 13 from the inwardly extending edge or flange 29 of the wall 11 to form a recess 30 for receiving a collar 31, having a beveled edge 32 for moving oil centrifugally toward the case. A concave ring 33 similar to the ring 25 of the motor end of the apparatus is preferably formed integrally with the hub 34 of the sprocket 7.

The collar 31 is preferably a separate member, and seats against a shoulder 35 of the fly wheel hub, the small end of the ring bearing against the collar, and cap screws 36 extending through openings 37 in the sprocket hub for securing the sprocket to the fly wheel and retaining the collar.

The ring and collar are preferably formed integrally since they may thus be more conveniently mounted on the relatively small sprocket and shaft, whereas the larger unit required for mounting on the hub of the fly wheel can more easily and economically be formed and assembled as herein described.

In using the invention, the rings and collars are provided in the described relation with the hubs and shafts of the driving and driven elements, and the case is provided with the wall portions adapted to form the collar-receiving recesses. Oil thrown over the sprockets and case walls to the curved-edge rings will tend to be moved centrifugally over the concave surfaces toward the portions of larger diameter and will be discharged centrifugally by the rotating ring to the walls of the case, thus being largely prevented from passing toward the inner portions of the vertical shaft and fly wheel hub, and will eventually move by gravity over the case walls to the sump.

When the apparatus is idle, oil deposited on the wall above the shafts may drain downwardly and pass under the flanges of the wall into the recesses, but will be arrested by the collars, which are sufficiently wide to restrain oil from movement outwardly and it will drain over the collars and rings to the sumps of the recesses.

Should oil overflow the collars while the sprockets are in motion, the rotary movement will tend to throw such oil toward the upper and outer walls of the recess, away from the bearing openings, and the beveled character of the edges of the collars will cause the oil to be thrown toward the inner face of the flanges of the case wall 11, any oil touching the collars being therefore restrained from the bearing apertures and conducted by the walls of the recess to the sumps of the recesses for passage through the wall apertures into the sumps of the case.

What I claim and desire to secure by Letters Patent is:

1. In apparatus of the character described including a casing having a shaft opening, and a flange forming an exterior annular recess at the opening, and a shaft located in said opening, a hub on the shaft located in the opening and having stepped peripheral portions forming offset shoulders, a collar engaging the inner shoulder, a drive member mounted on the outer peripheral portion of the hub and having a ring portion extending through the casing opening, and means attaching the drive member to the first named hub, said ring portion clamping the collar to the inner shoulder.

2. In combination with a rotatable member having a shouldered hub, a lubricant retaining casing having an opening for receiving said hub and an annular recess about the opening, a lubricant stopping collar sleeved on the hub and received in the annular recess, a drive member fixed to the hub and having a ring portion curved outwardly therefrom and engaging against said collar to retain the collar against the shoulder and receive lubricant dripping from said recess whereby the lubricant is returned to the case by way of the curved surface incidental to centrifugal force.

3. In combination with a rotatable member having a hub, a lubricant retaining casing having an opening to receive the hub and having an annular recess about the opening, a lubricant stopping collar on the hub and received in said recess, a drive member associated with the rotatable member for rotation therewith, a ring on the drive member projecting into alignment with the recess and having a peripheral surface curved outwardly and inwardly of the casing to receive lubricant dripping from the recess whereby the oil is returned to the casing over the outwardly curved surface due to centrifugal force incidental to rotation of the drive member.

In testimony whereof I affix my signature.

WALTER L. ECABERT.